US007209567B1

(12) United States Patent
Kozel et al.

(10) Patent No.: US 7,209,567 B1
(45) Date of Patent: Apr. 24, 2007

(54) COMMUNICATION SYSTEM WITH ADAPTIVE NOISE SUPPRESSION

(75) Inventors: David Kozel, Crown Point, IN (US); James A. Devault, Pensacola, FL (US); Richard B. Birr, Oviedo, FL (US)

(73) Assignee: Purdue Research Foundation, West Lafayette, IN (US)

( * ) Notice: Subject to any disclaimer, the term of this patent is extended or adjusted under 35 U.S.C. 154(b) by 562 days.

(21) Appl. No.: 10/390,259

(22) Filed: Mar. 10, 2003

Related U.S. Application Data

(63) Continuation-in-part of application No. 09/163,794, filed on Sep. 30, 1998, now abandoned.

(60) Provisional application No. 60/092,153, filed on Jul. 9, 1998.

(51) Int. Cl.
*H04B 15/00* (2006.01)

(52) U.S. Cl. ...................... 381/94.3; 704/226; 704/233

(58) Field of Classification Search ............... 381/94.1, 381/94.2, 94.3; 704/226, 233
See application file for complete search history.

(56) References Cited

U.S. PATENT DOCUMENTS 4,628,529 A 12/1986 Borth et al.
4,630,305 A 12/1986 Borth et al.
4,862,168 A 8/1989 Beard
5,023,940 A 6/1991 Johnson et al.
5,263,048 A * 11/1993 Wade ......................... 375/148
5,432,859 A 7/1995 Yang et al.
5,500,903 A 3/1996 Gulli
5,539,859 A 7/1996 Robbe et al.
5,550,924 A * 8/1996 Helf et al. ................. 381/94.3
5,610,987 A 3/1997 Harley
5,610,991 A 3/1997 Janse
5,651,071 A 7/1997 Lindemann et al.
5,668,927 A 9/1997 Chan et al.
5,727,072 A 3/1998 Raman
5,742,927 A 4/1998 Crozier et al.
6,097,820 A 8/2000 Turner
6,122,384 A * 9/2000 Mauro ....................... 381/94.3

* cited by examiner

*Primary Examiner*—Brian T. Pendleton
(74) *Attorney, Agent, or Firm*—William F. Bahret

(57) ABSTRACT

A signal-to-noise ratio dependent adaptive spectral subtraction process eliminates noise from noise-corrupted speech signals. The process first pre-emphasizes the frequency components of the input sound signal which contain the consonant information in human speech. Next, a signal-to-noise ratio is determined and a spectral subtraction proportion adjusted appropriately. After spectral subtraction, low amplitude signals can be squelched. A single microphone is used to obtain both the noise-corrupted speech and the average noise estimate. This is done by determining if the frame of data being sampled is a voiced or unvoiced frame. During unvoiced frames an estimate of the noise is obtained. A running average of the noise is used to approximate the expected value of the noise. Spectral subtraction may be performed on a composite noise-corrupted signal, or upon individual sub-bands of the noise-corrupted signal. Pre-averaging of the input signal's magnitude spectrum over multiple time frames may be performed to reduce musical noise.

31 Claims, 5 Drawing Sheets

COMMUNICATION SYSTEM WITH ADAPTIVE NOISE SUPPRESSION

RELATED APPLICATION

This application is a continuation-in-part and claims priority to U.S. patent application Ser. No. 09/163,794 filed Sep. 30, 1998 now abandoned and titled "Communication System with Adaptive Noise Suppression" which claims priority to U.S. Provisional Patent Application Ser. No. 60/092,153 filed Jul. 9, 1998 and titled "Communication System with Adaptive Noise Suppression," both applications of which are commonly assigned and the entire contents of which are incorporated herein by reference.

ORIGIN OF THE INVENTION

The invention described herein was made in the performance of work under a NASA contract and by an employee of the United States Government and is subject to the provisions of the Public Law 96-517 (35 U.S.C. §202) and may be manufactured and used by or for the Government for governmental purposes without the payment of any royalties thereon or therefore.

TECHNICAL FIELD OF THE INVENTION

The present invention relates generally to communication systems and in particular the present invention relates to an adaptive noise suppression in processing voice communications.

BACKGROUND OF THE INVENTION

Voice communication systems are susceptible to non-speech noise. One source of such noise can be environmental factors, such as transportation vehicles. This noise typically enters the communication system through a microphone used to receive voice sound. To improve the quality of the speech communication, efforts have been made to eliminate the undesired noise.

One type of noise suppression which uses band pass filters to remove noise at specific frequencies is described in U.S. Pat. No. 5,432,859 entitled "Noise-Reduction System" issued Jul. 11, 1995 to Yang et al. A system which reduces noise using spectral subtraction is described in U.S. Pat. No. 5,610,991 entitled "Noise reduction System and Device, and a Mobile Radio Station" issued Mar. 11, 1997 to Janse. Further, a system which used power spectral subtraction is described in U.S. Pat. No. 5,668,927 entitled "Method for Reducing Noise in Speech Signals by Adaptively Controlling a Maximum Likelihood Filter for Calculating Speech Components" issued Sep. 16, 1997 to Chan et al.

These noise suppression systems do not provide for amplification of specific frequencies of the voice signals prior to performing an adaptive noise suppression operation. For the reasons stated above, and for other reasons stated below that will become apparent to those skilled in the art upon reading and understanding the present specification, there is a need in the art for alternative noise suppression communication systems.

SUMMARY

The above mentioned problems with communication equipment and other problems are addressed by the present invention and will be understood by reading and studying the following specification.

In one embodiment, the present invention describes a voice communication system comprised of a microphone for receiving input sound signals and a processor for suppressing noise signals received with the input sound signals. The processor first pre-emphasizes the frequency components of the input sound signal which contain the consonant information in human speech. Next, the processor determines and updates an input sound signal-to-noise ratio. Using this ratio, it performs an adaptive spectral subtraction operation to subtract the noise signals from the input sound signals to provide output signals which are an estimate of voice signals provided in the input sound signals. A second filtering operation is performed for attenuating the portion of the output signals which contains musical noise. A squelching operation is then performed in the time domain to further eliminate musical noise. An analog-to-digital converter with an anti-aliasing filter is used to convert the input sound signals to digital signals for input to the processor, and a digital-to-analog converter with smoothing filter is provided to convert the output signals to analog signals for communication to a listener.

In another embodiment, a voice communication system comprises a microphone for receiving input sound signals, and a processor for suppressing noise signals received with the input sound signals. The processor pre-emphasizes frequency components of the input sound signals which contain consonant information in human speech. The processor also determines and updates an input sound signal-to-noise signal ratio, and performs an adaptive spectral subtraction operation using the input sound signal-to-noise signal ratio to subtract the noise signals from the input sound signals to provide output signals which are an estimate of voice signals provided in the input sound signals. A filter is provided for attenuating the portion of the output signals which contains musical noise. The voice communication system further comprises an analog-to-digital converter for converting the amplified input sound signals to digital signals for input to the processor, and digital-to-analog converter for converting the output signals to analog signals for communication to a listener.

In a further embodiment, a method of reducing noise in a communication system is provided. The method comprises receiving an input signal containing noise signals and speech signals, amplifying a portion of the input signal containing consonant information in the speech signals, spectrally subtracting an estimated noise signal from a magnitude of the input signal to provide a noise reduced signal, and attenuating a portion of the noise reduced signal containing voice signals to provide an output signal.

In a still further embodiment, a method of reducing noise in a communication system is provided. The method includes determining an average magnitude of a noise spectrum while speech is not preset on an input sound signal, wherein the average magnitude is determined for each of a plurality of frequency sub-bands of the noise spectrum. The method further includes determining a maximum ratio of noise to average noise over each sub-band and determining a running average of the maximum ratio of noise to average noise over each sub-band. The method still further includes receiving an indication that speech may be present on the input sound signal and, for each of a plurality of frames while receiving the indication that speech may be present on the input sound signal, detecting whether speech is present. While speech is detected, the method includes estimating a speech signal by subtracting from each sub-band the average noise for that sub-band multiplied by the lesser of the average magnitude of the noise spectrum for that sub-band and the running average of the maximum ratio of noise to average noise for that sub-band. While speech is not detected, the method includes estimating the speech signal to be zero.

The invention further includes methods and apparatus of varying scope.

DETAILED DESCRIPTION OF THE INVENTION

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims and equivalents thereof.

As described above, it is desired to incorporate adaptive noise suppression into communication equipment. In particular, speech communication equipment provided on transportation equipment susceptible to high levels of noise, such as an Emergency Egress Vehicle and a Crawler-Transporter used by the National Aeronautics and Space Administration (NASA). The Emergency Egress Vehicle is generally a military tank used to evacuate astronauts during an emergency, while the Crawler-Transporter is used to move a space shuttle to its launch site. In the case of the Emergency Egress Vehicle, people are fixed relative to the primary noise source, and the spectral content of the noise source changes as a function of the speed of the vehicle and its engine. In the case of the Crawler-Transporter, people can move relative to the Crawler-Transporter. Thus, the noise a person hears varies with their location relative to the Crawler-Transporter. Further, the operation of a hydraulic leveling device provided on the Crawler-Transporter changes the noise level experienced. It will be appreciated that the present communication system can be used in numerous applications, including but not limited to commercial delivery environments, aircraft communication, automobile racing, and military vehicles.

Due to the varying nature of the noise in these environments, an adaptive algorithm is provided to remove noise. Because the noise frequencies produced by most of the transportation applications are in the voice band range, standard filtering techniques will not work. A signal-to-noise ratio dependent adaptive spectral subtraction algorithm is described herein which eliminates the noise.

Figure 1:
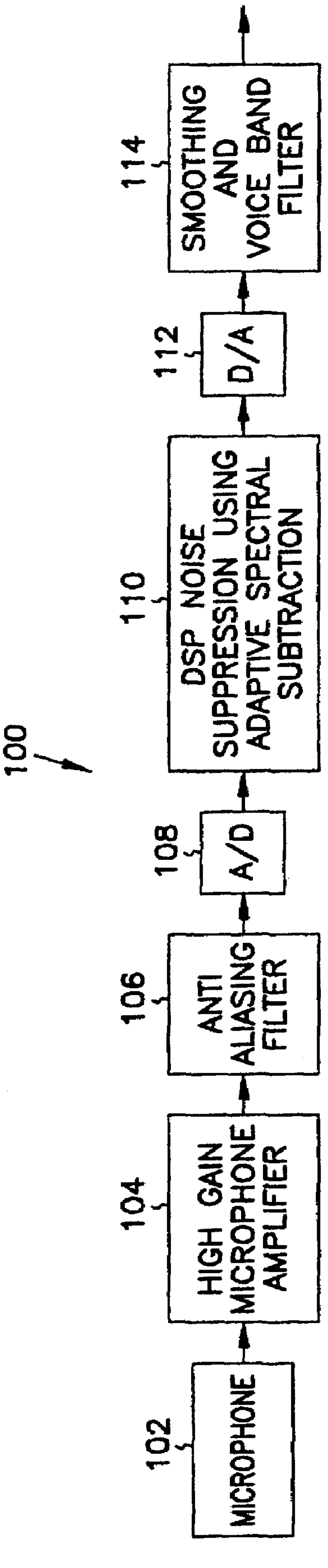
FIG. 1 is a block diagram of an adaptive noise suppression system in accordance with an embodiment of the invention.

A block diagram of an adaptive noise suppression system 100 is shown in FIG. 1. The system includes a microphone 102 for receiving voice and environmental noise signals. In one embodiment, a microphone is used which has noise suppression of a mechanical nature, and which provides approximately 15 dB of noise suppression. This suppression level is sufficient to provide a signal-to-noise ratio favorable for spectral subtraction. The system includes an amplifying filter 106 for proper signal level and anti-aliasing, an analog-to-digital converter 108, an adaptive digital signal processor (DSP) 110, a digital-to-analog converter 112, and a smoothing filter.

In operation, noise or noise-corrupted speech enters the microphone. A high gain amplifier 104 is provided to amplify the voice signal up to a ±2.5 Volt range for processing by the Analog-to-digital (A/D) converter. The amplification level, therefore, is dependent upon the A/D converter used. Before entering the A/D converter, the amplified signal passes through an anti-aliasing low-pass filter. In one embodiment, the filter has a 3 dB attenuation at 3 KHz, and a 30 dB attenuation at 5.9 KHz. The filtered signal is then sampled by the A/D converter. In one embodiment, the A/D converter uses a 12-bit resolution and a 12.05 KHz sampling rate. The digitized signal is then processed by the DSP. The digital signal processor performs pre-emphasis filtering and noise suppression using signal-to-noise ratio dependent adaptive spectral subtraction, described in detail below. The processor first pre-emphasizes the frequency components of the input sound signal which contain the consonant information in human speech. By emphasizing this signal region, the noise suppression of the system is enhanced.

The system pre-emphasizes (amplifies) higher frequency components of received sound, including the noise and voice components in accordance with the power characteristics of human speech. Even though most of the energy of speech is contained in the lower frequency range (about 300 to 1000 Hz), amplifying upper frequencies of above about 1000 Hz amplifies more consonant speech information. In one embodiment, therefore, the amplification upper range is about 1000 to the sample frequency divided by two. The pre-emphasis is performed prior to spectral subtraction to give the higher frequency components more importance during spectral subtraction. Thus, the intelligibility of speech is improved during the subtraction process. The resulting output signals are then de-emphasized (attenuated) to reduce the effect of musical noise. An optional squelching operation is then performed in the time domain to further eliminate musical noise.

After the noise is removed, the digital signal is converted back to an analog signal in a digital-to-analog converter (D/A). Again in one embodiment, the D/A converter operates at a rate of 12.05 KHz.

The analog signal is then processed through a smoothing filter. In one embodiment, a low-pass Bessel filter with a 3 dB frequency of 3 Hz is used. This filter can be replaced with a voice band filter, which is a band-pass filter with low and high 3 dB passband frequencies of 300 and 3 KHz, respectively. If the voice band filter does not have good damping characteristics, the smoothing filter is necessary to eliminate transients produced from step discontinuities resulting from the D/A conversion. After the voice band filter, the signal is modulated and transmitted by a communication device. A detailed description of the DSP is provided in the following section.

ADAPTIVE DIGITAL SIGNAL PROCESSOR

Figure 2:
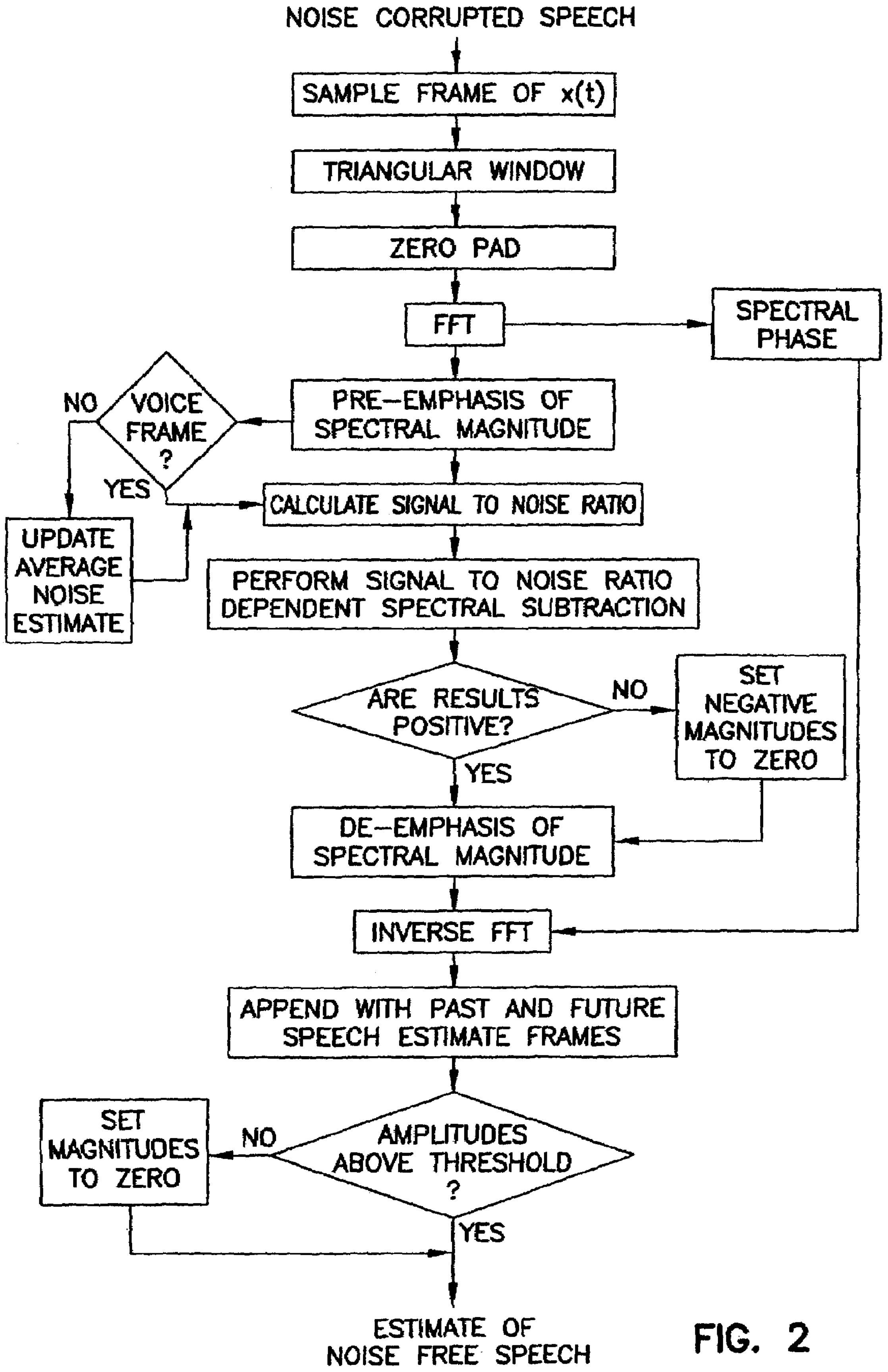
FIG. 2 illustrates a flow diagram of an adaptive spectral subtraction processor in accordance with an embodiment of the invention.

A flow diagram of an adaptive spectral subtraction processor which is signal-to-noise ratio dependent is shown in FIG. 2. Before providing a detailed description of the signal processor implementation, a description of the spectral subtraction algorithm is provided.

The additive noise model used for spectral subtraction assumes that noise-corrupted speech is composed of speech plus additive noise. Noise-corrupted speech, x(t), is defined by:

$$x(t)=s(t)+n(t),$$

where s(t) is speech, and n(t) is noise. In a basic manner, to solve for the speech, the noise is subtracted from the noise-corrupted speech. To focus on the magnitude of noise, a Fourier Transform of x(t):

$$X(f)=S(f)+N(f)$$

is first taken. Because X(f), S(f), and N(f) are complex, they can be represented in polar form as:

$$|X(f)|e^{j\theta x}=|S(f)|e^{j\theta s}+|N(f)|e^{j\theta n} \quad (1)$$

Solving for the speech:

$$|S(f)|e^{j\theta s}=|X(f)|e^{j\theta x}-|N(f)|e^{j\theta n} \quad (2)$$

Since the phase of the noise is generally unavailable, the phase of the noise-corrupted speech is used to approximate the phase of the speech. This is equivalent to assuming the noise-corrupted speech and the noise are in phase. As a result, the speech magnitude is approximated from the difference of the noise-corrupted speech magnitude and noise magnitude as:

$$\hat{S}(f)=|\hat{S}(f)|e^{j\theta x}=(|X(f)|-|N(f)|)e^{j\theta c} \quad (3)$$

The type of spectral subtraction described above is a magnitude spectral subtraction, because the magnitude of the noise spectrum at each frequency is subtracted. In its most general form, the implemented spectral subtraction algorithm is written as:

$$\hat{S}(f)=\{|X(f)|^b-\alpha(SNR(f)E[|N(f)|^b]\}^{1/b}e^{j\theta x} \quad (4)$$

where $E[|N(f)|^b]$ represents the expected value of $[|N(f)|^b]$. The exponent b, equals one for magnitude spectral subtraction and two for power spectral subtraction. The proportion of noise subtracted, α, can be variable and signal-to-noise ratio dependent. In general α is greater than one, to over subtract and reduce distortion caused from using the average noise magnitude instead of the actual noise magnitude. The inverse Fourier Transform yields an estimate of the speech as:

$$\hat{S}(t)=F^1\{\hat{S}(f)\} \quad (5)$$

Figure 3A:
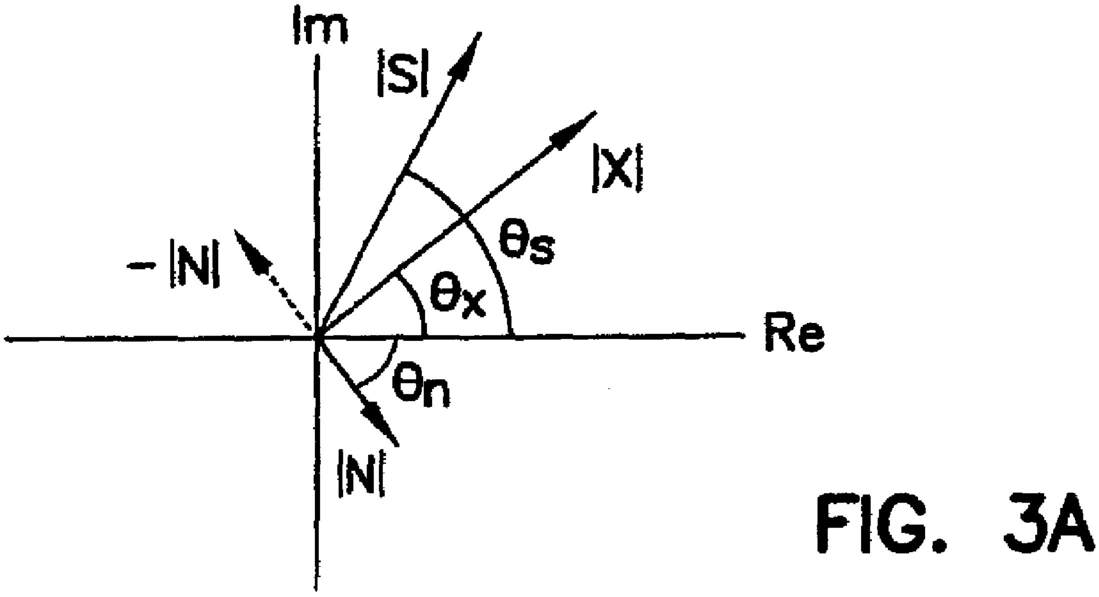
FIGS. 3*a* and 3*b* are vector representations of signal components in accordance with one embodiment of the invention.
Figure 3B:
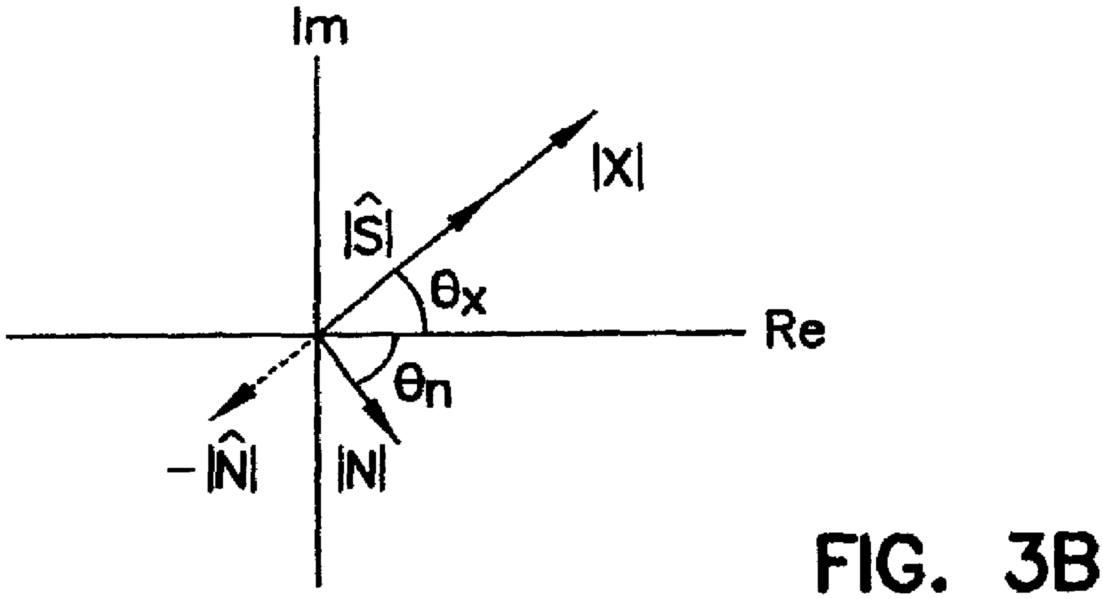

The phase approximation used in the speech estimate produces both magnitude and phase distortion in each frequency component of the speech estimate. This can be seen in FIGS. 3A and 3B by the vector representation of $|S(f)e^{j\theta s}|$ and $\hat{S}(f)$, respectively, for any one frequency. If the magnitude of the noise |N|, is small relative to the magnitude of the corrupted speech, |X|, the distortion caused by using the noise-corrupted speech phase $\theta_x$, in place of the noise phase is minimal and unnoticeable to the human ear. Likewise, if the phase of the noise, $\theta_n$, is close to the phase of the corrupted speech $\theta_x$, the resulting error produced by the approximation is minimal and unnoticeable to the human ear. Since the relative phase between $\theta_x$, and $\theta_n$ is unknown and varies with time and frequency, the ratio between the magnitude of the noise-corrupted speech and the noise is used as an indication of accuracy.

Figure 4A:
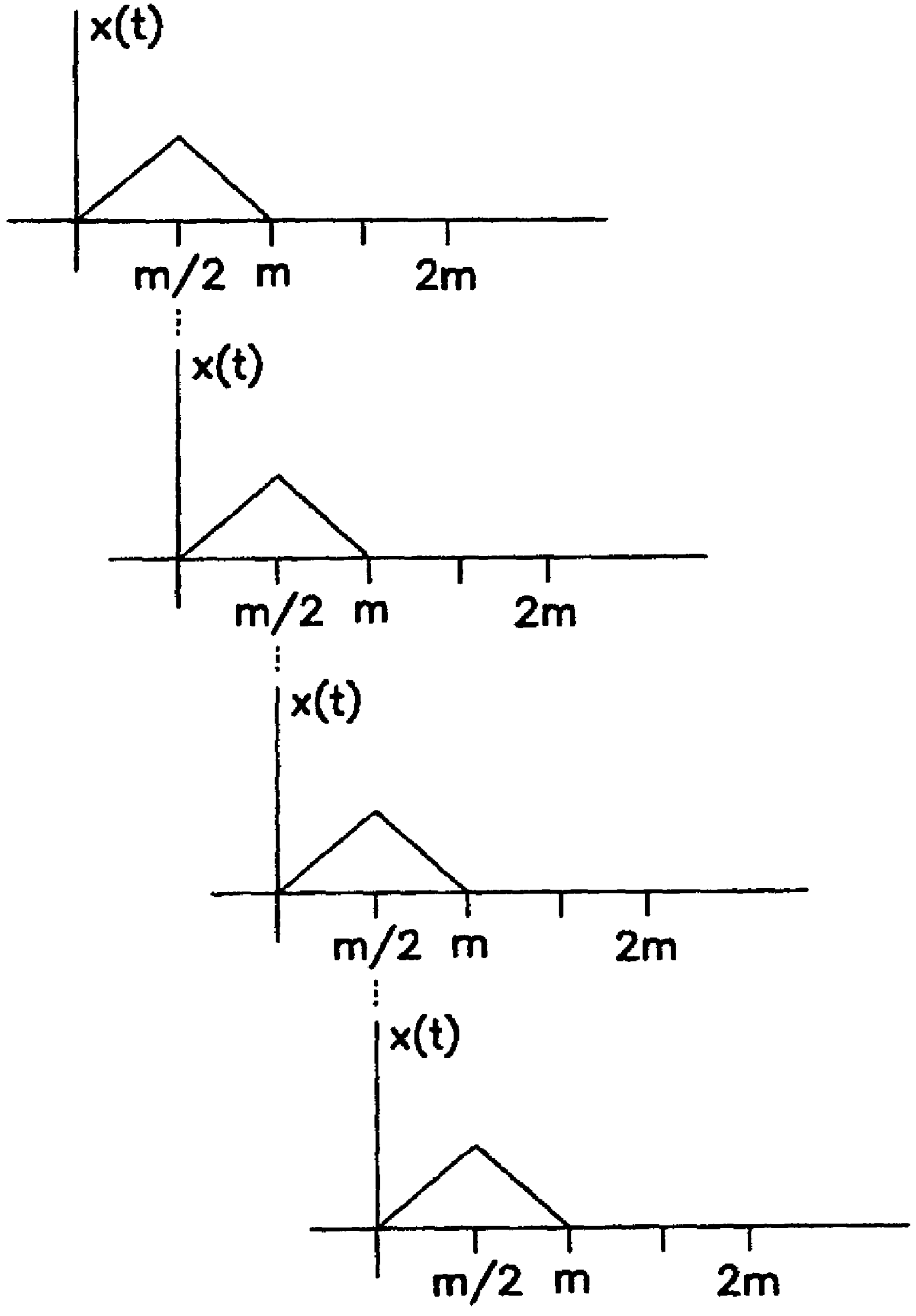
FIGS. 4*a* and 4*b* illustrate signal processing using windowing, zero padding, and recombination in accordance with one embodiment of the invention.

An implementation of the spectral subtraction algorithm is illustrated in FIG. 2. m/2 Noise corrupted, speech signals are first sampled and appended to the previous m/2 samples. These m samples are then windowed and zero padded. The process of appending, windowing, and zero padding of the signal is shown in FIG. 4*a*. Thus, the sampled signal is segmented into frames each containing 2 m points. This is required since the algorithm uses a Fast Fourier Transform (FFT) which assumes that the signal is periodic relative to the frames. If a window is not used, spurious frequencies are produced due to signal levels at the ends of each frame not being equal. As a result of windowing, each frame is required to overlap the previous frame in time by 50 percent. Appending the previous m/2 samples provides this overlap. This allows the two triangular windowed components to add to the original signal when recombined. If a window type other than a triangular window is used, the addition of frames can produce oscillation errors of up to approximately 9 percent of the original amplitude in the recombined signal.

Spectral subtraction can be considered as a time varying filter which can vary from frame to frame, and is defined by $$\begin{aligned}\hat{S}(f) &= |\hat{S}(f)|e^{j\theta x} = |H(f)||X(f)|e^{j\theta x} \\ &= (|X(f)|-|N(f)|)e^{j\theta x} \\ &= \left|1-\frac{|N(f)|}{|X(f)|}\right||X(f)|e^{j\theta x}\end{aligned} \quad (6)$$

Figure 4B:
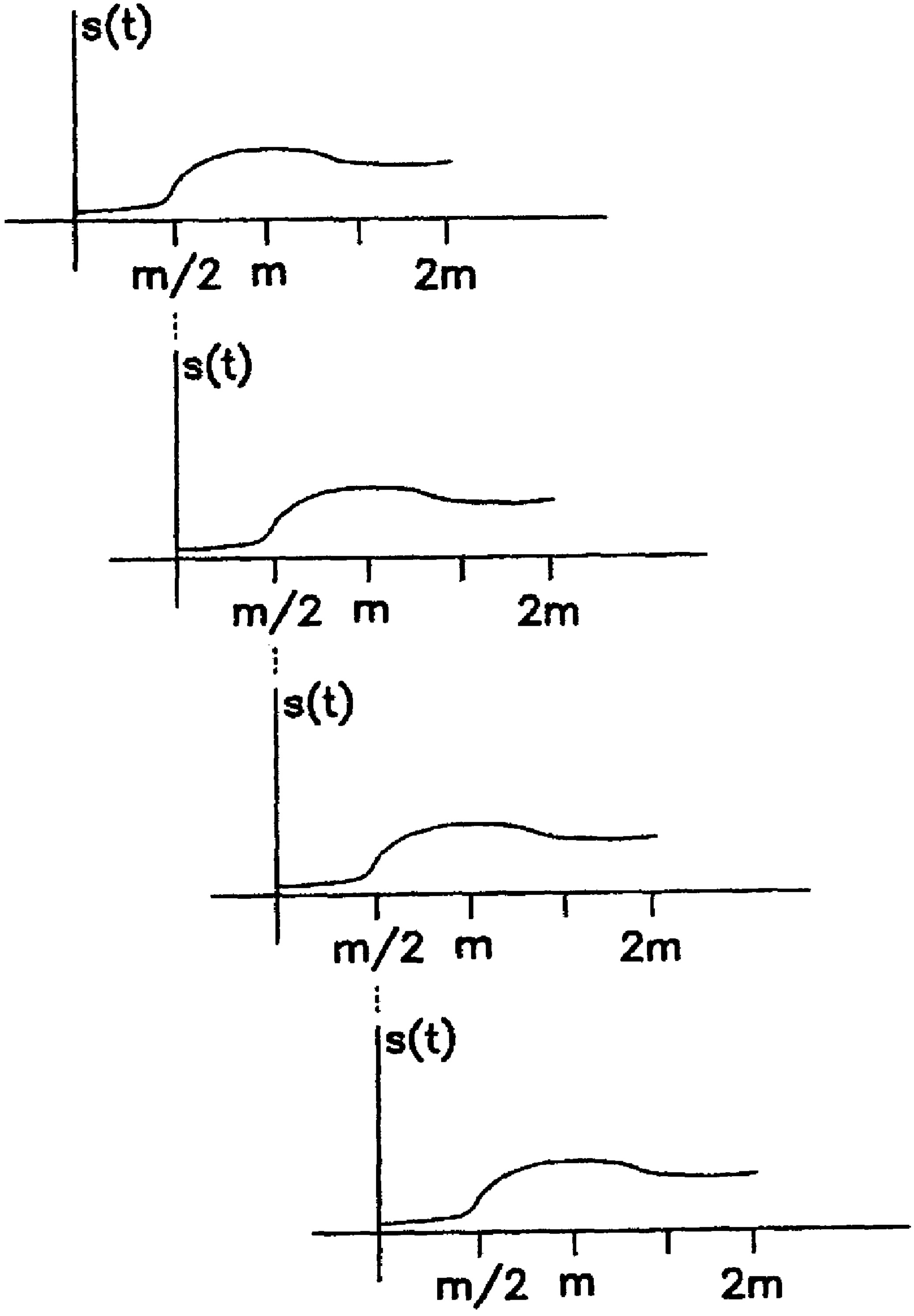

The filter is obtained from both the corrupted speech and noise, and has a length of m points. The length of the time domain response of such a filter is 2m−1. To eliminate the effects of circular convolution, therefore, a windowed signal of length m is zero padded by m points to a total length of 2 m points. Since there is a 50 percent overlap in each frame, only m/2 points of new input information are obtained. Since the response lasts for 2 m points, four output frames which overlap in time must be combined to provide m/2 new output points to provide the correct output for each frame. This is shown in FIG. 4*b*.

Once the signal has been windowed and zero padded the FFT is taken of the 2 m points. The resulting magnitude and phase of the signal spectrum are determined. The phase is set aside for later recombination with the spectral subtracted magnitude. The magnitude of the signal spectrum is used to determine if the frame contains voice or is voice free. This is done by comparing the maximum value of the signal magnitude spectrum with a proportion, γ, of the maximum value of the average noise magnitude spectrum.

That is, if $$\max(|X(kf)|)>\gamma\max(|\overline{N(kf)}|) \text{ for } k=1, \ldots, m \quad (7)$$

then the frame is considered to be a voice frame. The proportion, γ, can be initialized by comparing the maximum magnitude of a known voice frame to the maximum magnitude of the average noise.

The average magnitude spectrum for the noise is obtained as follows. When the algorithm is first being initialized an initial noise only sequence of frames must be obtained to get a baseline on the average magnitude spectrum of the noise. For frame one of the initial noise only sequence:

$$|\overline{N(kf)}|=|X(kf)| \text{ for } k=1, \ldots, m \quad (8)$$

for other frames of the initial noise only sequence:

$$|\overline{N(kf)}|=\delta|\overline{N(kf)}|+(1-\delta)|X(kf)| \text{ for } k=1, \ldots, m \quad (9)$$

where $0.70 \leqq \delta \leqq 0.95$.

Once the initial average noise estimate is obtained from a known noise only test sequence, each frame of signal is checked for voice using max(|X(kf)|). If the equation related to max(|X(kf)|) is not satisfied, the frame is considered unvoiced and the equation for the other frames of the initial noise only sequence is used with a predetermined value for δ that is in the specified range. In general δ determines how quickly the noise estimate can vary. The technique is simple, but works well, since voice frames are generally strong in specific frequencies due to excitation of the vocal cords.

After the average noise magnitude spectrum is updated, the magnitude spectrum of the signal and the average noise magnitude spectrum are used to perform subtraction. The signal-to-noise ratio dependent proportion, α is determined using the following equation:

$$\alpha = \frac{\eta \sum_{k=1}^{m} |\overline{N(kf)}|}{\sum_{k=1}^{m} |X(kf)|} \quad (10)$$

When the algorithm is first initialized η is determined by testing a signal frame that is known to contain voice. η is chosen such that α is approximately 1.78 in the voiced frames. Once α is determined spectral subtraction is performed using:

$$|\hat{S}(kf)|=|X(kf)|-\alpha|\overline{N(kf)}| \text{ for } k=1, \ldots, 2\text{ m} \quad (11)$$

While the spectral subtraction may be performed on the composite input sound signal as demonstrated in this embodiment, other embodiments of the invention provide for this spectral subtraction to be performed on sub-bands of the composite spectrum of the input sound signal.

If any of the estimates for $|\hat{S}(kf)|$ are negative, they are set to zero. $|\hat{S}(kf)|$ is then low-pass filtered to eliminate musical noise which is generally high frequency. The lower the 3 dB frequency of the filter, the more noise and speech eliminated. After low-pass filtering, the phase of the noise-corrupted speech, $\theta_x$, is combined with the magnitude of the estimate of the speech and the inverse FFT is taken. This provides one of the four offset output frames that must be combined using the overlap add method described above. The summing provides an averaging effect for reducing phase errors. If necessary, a low level signal squelching process, performed in the time domain, can be provided. Due to the mechanical nature of the human vocal track, speech cannot being abruptly in one time frame, or in the frames surrounding that time frame. Thus, the low level signal squelching process removes musical noise artifacts which tend to be high frequency and random in nature.

The low level signal squelching processor looks at three frames of estimated speech: the past, present and future frames. Future frame estimates of speech are obtained by delaying the speech estimate for one frame before being output. Thus, the signal-to-noise ratio dependent spectral subtraction algorithm is actually calculating the future output, while the present output is being held in a buffer to determine if low level squelching is required, and the past frame is being output through the D/A. The algorithm is described by the following equation:

$$\text{if } |\hat{S}(kT,i)|<\mu\max(|\overline{N(kT,L)}|) \text{for } k=1, \ldots, m/2, \text{ and } i=L-1, L, L+1 \text{ then } |\hat{S}(kT,i)|=0 \text{ for } k-1, \ldots, m/2 \quad (12)$$

where μ is a user discretion proportion.

A noise cancellation communication system in accordance with the foregoing embodiment was tested in an emergency egress vehicle used to evacuate astronauts if an emergency situation arises during a launch. The noise level inside the vehicle is 90 decibels with the engine running and 120–125 decibels once the vehicle starts moving. As a result, it is impossible to hear what the emergency crew is saying during a rescue operation. The headsets used by the rescue crew had microphones with noise suppression of a mechanical nature, which provided 15 decibels of noise suppression. Furthermore, the frequency response of the microphone attenuated frequencies outside of the voice band range of 300 Hz to 3 kHz.

Because the noise input by the microphone is directly in the range of voice band frequencies, standard filtering techniques attenuate both noise and speech by the same factor. The noise experienced was not constant. In fact, as each track of the egress vehicle hit the ground, the reaction force caused an impulse on the vehicle which excited its resonant frequencies. The signal-to-noise ratio dependent adaptive spectral subtraction algorithm was tested on the emergency egress vehicle using the following parameter settings, m=2.56, γ=2.0, δ=0.90, η=4.0, and μ=0.025. The words "test, one, two, three, four, five" were spoken into the microphone. A signal-to-noise ratio of approximately 15 dB existed for the original sampled signal. As mentioned, the microphone provided approximately 15 dB of noise attenuation. This provided a favorable signal-to-noise ratio, which is required for spectral subtraction to work well. Lowering the gain and talking louder also improved the signal-to-noise ratio without saturating the voltage limits of the A/D converter. The spectral subtraction provided approximately 20 dB of improvement in the signal-to-noise ratio. Listening test verified that the noise was virtually eliminated, with little or no distortion due to musical noise.

For a further embodiment of the invention, a frequency sub-band based adaptive spectral subtraction algorithm is provided. Since the noise and speech have no physical dependence, the assumption that the noise and speech are in phase at any or all frequencies has no basis. Rather, noise and speech can be thought of as two independent random processes. The phase difference between them at any frequency may have an equal probability of being any value between zero and 2 π radians. Thus, the noise and speech vectors at one frequency may add with a phase shift while simultaneously at a different frequency may subtract with a different phase shift. Thus, subtracting an assumed in-phase noise signal from the noise-corrupted speech has the same probability of reducing the particular frequency component of the speech even further as it does of brining it back to its proper level.

Furthermore, such subtraction is generally almost certain to cause some distortion in the phase. The amount of error produced at each frequency depends upon the relative phase shift and the relative magnitudes of the speech and noise vectors. For each spectral frequency that the magnitude of the speech is much larger than the corresponding magnitude of the noise, the error is negligible. For the consonant sounds of relatively low magnitude, the error will be larger. This is true even if the magnitude of the noise at each frequency could be exactly determined during speech. For the above reasons, the smaller the amount of noise that needs to be subtracted off, the less the degradation of the speech.

For a given range of frequencies, say zero to six kilohertz, each speech sound is only composed of some of the frequencies. No typical speech sound is composed of all of the frequencies. If the spectrum is divided into frequency sub-bands, the frequency sub-bands containing just noise can be removed when speech is present. Furthermore, during speech the power level of the frequency sub-bands that contain speech will increase by a larger proportion than the power level of the entire spectrum. Thus, speech will be easier to detect by looking at the sub-band power change than by looking at the overall power change. This is especially true of the consonant sounds, which are of lower power, but are concentrated in one or two frequency sub-bands. By dividing the signal into frequency sub-bands, frequency bands that do not contain useful information can be removed so that the noise in those frequency sub-bands does not compete with the speech information in the useful sub-bands.

As described above, the average magnitude of the noise spectrum, $|\overline{N}(f)|$, is usually used to approximate the magnitude of the noise spectrum. Since the magnitude of the noise spectrum will in general have sharper peaks then the average magnitude of the noise spectrum, a multiple, μ, (which is usually greater than one) of the average magnitude of the noise spectrum is subtracted from the magnitude of the noise-corrupted speech spectrum. This is done to reduce "musical-noise" which is caused from the incomplete elimination of these random peaks in the magnitude of the noise spectrum. Unfortunately, this also removes desired speech, which reduces intelligibility for the lower amplitude consonant sounds. A way to reduce the number and size of the random peaks in the magnitude of the noise spectrum is to average the magnitude of the noise-corrupted speech spectrums over time. In general, the magnitude of the noise spectrum has peaks that change from time frame to time frame in a more random fashion than the magnitude of the speech spectrum. Averaging the magnitude of the noise-corrupted speech spectrum over multiple time frames reduces the size and variation in these peaks without noticeable degradation to the speech. The reduction in the size and variation of these peaks in the magnitude of the noise-corrupted speech spectrum allows for a smaller multiple of the average magnitude noise spectrum to be used to eliminate them. Since these spectral peaks are the cause of the musical noise, removing them eliminates the musical noise. Using a smaller proportion of average magnitude of the noise spectrum to remove the peaks retains more of the low amplitude speech.

The incoming sound signal is low-pass filtered to prevent aliasing, sampled, windowed with a hamming window, and zero padded to twice its length. As with a triangular window, a hamming window tails off the signal at each end. Each time frame, L, of the signal overlaps the previous time frame by 50 percent. An "m" point Fast Fourier Transform is taken, and the magnitude of the spectrum is separated from the phase angle. The magnitude of the signal spectrum is averaged with the magnitude of the signal spectrum from the $\delta_m$ previous and the $\delta_m$ future time frames. The value for $\delta_m$ is chosen small enough so as not to degrade the speech spectrum, but large enough to smooth the variations in the magnitude of the noise spectrum over different time frames. The $\delta_m$ future time frames are obtained by processing frames of data and holding the results for $\delta_m$ time frames. The phase angle will not be altered. The phase angle for time frame L will be associated with the averaged magnitude of the signal spectrum described above for time frame L. This averaged magnitude of the signal spectrum will be used throughout the algorithm.

If the signal is noise-corrupted speech $|X_L(f)|$ will be used to represent the averaged magnitude of the noise-corrupted speech spectrum for time frame L. If the signal just contains noise, $|N_L(f)|$ will be used to represent the averaged magnitude of the noise spectrum for time frame L. The average magnitude of the signal spectrum is partitioned into frequency sub-bands. One example of the possible choice of frequency sub-band is shown in Table 1. The range of frequencies in each sub-band is, for one embodiment, chosen in accordance with the Bark scale (as described in E. Zwicker and H. Fastl, Psychoacoustics Facts and Models, Springer-Verlag, 1990) to account for the hearing characteristics of the human ear. Other sub-bands could be used with embodiments of the invention.

TABLE 1

Example of Possible Frequency Ranges for the Frequency Sub-Bands

| Sub-band | Start Bin | Stop Bin | Number of Bins | Beginning Frequency (Hz) | | Ending Frequency (Hz) |
|---|---|---|---|---|---|---|
| 1 | 1 | 8 | 8 | 0 | – | 399 |
| 2 | 9 | 10 | 2 | 400 | – | 509 |
| 3 | 11 | 13 | 3 | 510 | – | 629 |
| 4 | 14 | 16 | 3 | 630 | – | 769 |
| 5 | 17 | 20 | 4 | 770 | – | 919 |
| 6 | 21 | 24 | 4 | 920 | – | 1079 |
| 7 | 25 | 28 | 4 | 1080 | – | 1269 |
| 8 | 29 | 33 | 5 | 1270 | – | 1479 |
| 9 | 34 | 38 | 5 | 1470 | – | 1719 |
| 10 | 39 | 45 | 7 | 1720 | – | 1999 |
| 11 | 46 | 52 | 7 | 2000 | – | 2319 |
| 12 | 53 | 61 | 9 | 2320 | – | 2699 |
| 13 | 62 | 72 | 10 | 2700 | – | 3149 |
| 14 | 73 | 84 | 11 | 3150 | – | 3699 |
| 15 | 85 | 101 | 17 | 3700 | – | 4399 |
| 16 | 102 | 122 | 21 | 4400 | – | 5299 |
| 17 | 123 | 128 | 6 | 5300 | – | 6000 |

To key into the communication system, the user is required to press and hold a push-to-talk button while speaking into the microphone. Thus, it is assumed that speech is not present when the push-to-talk is not pressed. For each time frame, L, when the push to talk is not pressed, the signal is just noise.

$$|X_L(kf)|=|N_L(kf)| \text{ for frequency bins k=1, . . . , } m \quad (13)$$

While the push-to-talk is not pressed, the statistics of $|N_L(f)|$ are determined, and the algorithm is initialized. The statistics of $|N_L(f)|$ are updated every $n_A$ time frames until a push-to-talk occurs. $n_A$ is chosen large enough to provide reliable noise spectrum statistics and small enough to be updated before each push-to-talk. The average of $|N_L(f)|$ for each frequency bin is determined using the sample mean.

$$\overline{N}(kf) = \frac{1}{n_A}\sum_{L=1}^{n_A} |N_L(kf)| \text{ for frequency bin } k = 1, \ldots , m \quad (14)$$

The power in frequency sub-band v, based on $|X_L(f)|$, for time frame L is $$P_{Lv} = \sum_{k=\beta_v}^{\xi_v} |X_L(kf)|^2 \quad (15)$$

where $\beta_v$ and $\xi_v$ are the beginning and ending frequency bins for sub-band v. The average power in frequency sub-band v over the $n_A$ time frames is estimated using the sample mean.

$$P_{Av} = \frac{1}{n_A} \sum_{L=1}^{n_A} P_{Lv} \text{ for sub-band } v = 1, \ldots, \eta \quad (16)$$

A unitless form of the standard deviation of the power in frequency sub-band v over the $n_A$ time frames is estimated using the square root of the sample variance and the sample mean of the power.

$$\sigma_v = \frac{\sqrt{\frac{1}{(n_A - 1)} \sum_{L=1}^{n_A} (P_{Av} - P_{Lv})^2}}{P_{Av}} \text{ for sub-band } v = 1, \ldots, \eta \quad (17)$$

The square root of this value is used as a simple, but crude, approximation to the standard deviation of the average magnitude of the noise spectrum in frequency sub-band v over the $n_A$ time frames.

$$\sigma_{Nv} = \sqrt{\sigma_v} \text{ for sub-band } v=1, \ldots, \eta \quad (18)$$

The threshold proportions for speech in each frequency sub-band are dependent upon the standard deviation of the power in that frequency sub-band and externally adjustable proportions $\alpha_{d1}$ and $\alpha_{d2}$.

$$\tau_{dv} = (\alpha_{d1} + \alpha_{d2}\sigma_v) \text{ for sub-band } v=1, \ldots, \eta \quad (19)$$

Once an average value for the noise is determined, the maximum ratio of noise to average noise over the sub-band $$MR_{Lv} = \max_{\substack{over \\ k=\xi_v, \ldots, \beta_v}} \left( \frac{|N_L(kf)|}{|\bar{N}(kf)|} \right) \text{ for sub-bands } v = 1, \ldots, \eta \quad (20)$$

and the running average of $MR_{Lv}$ $$AMR_v = (1-\mu)AMR_v + \mu MR_{Lv} \text{ for sub-bands } v=1, \ldots, \eta \quad (21)$$

are determined

When the push-to-talk is pressed, the algorithm must determine if speech is present during that particular time frame. For each time frame L, the noise flags for the sub-bands $\gamma_v$, the noise flag counter $\gamma_C$, and the noise flag record vector $\gamma_R$, are initialized to the following values:

$$\gamma_v = 1 \text{ for sub-band } v=1, \ldots, \eta \quad (22)$$

$$\gamma_C = 0 \quad (23)$$

$$\gamma_R(1) = 0 \quad (24)$$

Then, for sub-band v, $$\text{if } \{[\text{all } P_v(L, \ldots, L+\delta_d) > \tau_{dv} P_{Av}] \text{ or } [\text{all } P_v(L-\delta_d, \ldots, L) > \tau_{dv} P_{Av}] \text{ or } [\text{all } P_v(L-\delta_c, \ldots L+\delta_c) > \tau_{dv} P_{Av}] \quad (25)$$

set $$\gamma_v = 0 \quad (26)$$

$$\gamma_C = \gamma_C + 1 \quad (27)$$

$$\gamma_R(\gamma_C) = v \quad (28)$$

Equations (25) through (28) are repeated for sub-band v=1, . . . , η. In equation (25), the time frame shifts $\delta_d$ and $\delta_c$ required for speech are based upon the minimum time duration required for most speech sounds (Digital Signal Processing Application with the TMS320C30 Evaluation Module: Selected Application Notes, literature number SPRA021, 1991, p. 62). The time frame shift $\delta_d$ is used to detect the beginning and ending of speech sounds. The frame shift $\delta_c$ detects isolated speech sounds. $\delta_c$ is generally half the size of $\delta_d$. Equation (25) looks into the future (i.e., $P_v(L, \ldots, L+\delta_d)$) by processing frames of data but holding back decisions on them for $\delta_d$ time frames.

After using equation (25) to check all of the sub-bands, if $[(\gamma_C > 1)$ or $(\gamma_R(1) > 14)]$, the frame is considered to be a speech frame. During speech frames, the ratio of the sum of noise-corrupted speech to sum of average noise $$R_{Lv} = \frac{\sum_{k=\beta_v}^{\xi_v} |X_L(kf)|}{\sum_{k=\beta_v}^{\xi_v} |\bar{N}_L(kf)|} \text{ for frequency sub-bands } v = 1, \ldots, \eta \quad (29)$$

is updated. Then, the speech estimate is determined using $$|\hat{S}_L(kf)| = X_L(kf)| - \min[R_{Lv}(\alpha_{pR1} + \alpha_{pR2}\sigma_{Nv}), AMR_v(\alpha_{pA1} + \alpha_{pA2}\sigma_{Nv})](1 + \alpha_f \gamma_v)\bar{N}(kf) \text{ for } v=1, \ldots \eta \text{ and } k=\xi_v, \ldots, \beta_v \quad (30)$$

If the magnitude of the estimated speech spectrum is less than zero for any frequency, it is set equal to zero. In equation (30), the amount of the average noise subtracted is weighted by a minimum proportional to $R_{Lv}$ or $AMR_v$. $R_{Lv}$ is large during strong vowel sounds but small during weaker consonant sounds. $AMR_v$ is the running average of the proportion needed to remove all of the noise. Using the minimum of these two terms allows the removal of large amounts of noise in a particular frequency sub-band when it contains relatively strong speech. Furthermore, only small amounts of noise are removed from a particular frequency sub-band when it contains relatively weak speech. The above weights contain the approximation to the standard deviation of the noise for the particular frequency sub-band $\sigma_{Nv}$ to account for the variation in the noise for that frequency sub-band. The noise flag $\gamma_v$ greatly increases the proportion subtracted when speech is not present in a frequency sub-band. Equation (30) is designed to essentially remove all noise in frequency sub-bands that do not contain speech information while preserving as much speech information as possible when removing noise from frequency sub-bands that contain speech information. The α's are preset parameters.

If the time frame is not a speech frame, it is a noise frame. During noise frames, $$|N_L(kf)| = |X_L(kf)| \text{ for frequency bins } k=1, \ldots, m, \quad (31)$$

and the following values are updated. The maximum ratio of noise to average noise over each frequency sub-band $$MR_{Lv} = \max_{\substack{over \\ k=\xi_v, \ldots, \beta_v}} \left( \frac{|N_L(kf)|}{|\overline{N}(kf)|} \right) \text{ for frequency sub-bands } v = 1, \ldots, \eta. \tag{32}$$

The running average of $MRL_V$ $$AMR_v = (1-\mu)AMR_v + \mu MR_{Lv} \text{ for } v=1, \ldots, \eta. \tag{33}$$

The running average of the power $$P_{Av} = (1-\mu)P_{Av} + \mu P_{Lv} \text{ for frequency sub-bands } v=1, \ldots, \eta, \tag{34}$$

and the running average of the noise at each frequency $$\overline{N}(kf) = (1-\mu)\overline{N}(kf) + \mu|N_L(kf)| \text{ for } k=1, \ldots, m. \tag{35}$$

Also, the estimated speech signal is set to zero.

$$|\hat{S}_L(kf)| = 0 \text{ for } k=1, \ldots, m \tag{36}$$

At this point, the algorithm checks to see if the push-to-talk is still being pressed. If it is, the process is repeated starting at equation (22). If it is not, the algorithm goes back to the initialization stage, equation (13), to update the statistics of the noise and obtain new threshold proportions.

If the system does not contain a push-to-talk, the algorithm initializes when first turned on . It then performs as described above with the exception that it only returns to equation (13) upon reset.

CONCLUSION

Adaptive noise suppression systems have been described for removing noise from voice communication systems. A signal-to-noise ratio dependent adaptive spectral subtraction algorithm was described herein which eliminates the noise. For some embodiments, pre-averaging of the input signal's magnitude spectrum over multiple time frames is performed to reduce musical noise. Also, sub-band based adaptive spectral subtraction is utilized.

The system includes a microphone, anti-aliasing filter, an analog-to-digital converter, a digital signal processor (DSP), a digital-to-analog converter, and a smoothing filter. The DSP pre-emphasizes (amplifies) higher frequency components of received sound, including the noise and voice components in accordance with the power characteristics of human speech. The pre-emphasis is performed prior to spectral subtraction to give the higher frequency components more importance during spectral subtraction. Thus, the intelligibility of speech is improved during the subtraction process. The resulting ouput signals are then de-emphasized (attenuated) to reduce the effect of musical noise. Finally, the system provides a low level signal squelching process to remove musical noise artifacts which tend to be high frequency and random in nature.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A method of reducing noise in a communication system, the method comprising:

averaging an input sound signal's magnitude spectrum over multiple time frames to reduce musical noise;

determining an average magnitude of a noise spectrum while speech is not present on the input sound signal, wherein the average magnitude is determined for each of a plurality of discrete frequencies of the noise spectrum;

determining a maximum ratio of noise to average noise over each of a plurality of sub-bands;

determining a running average of the maximum ratio of noise to average noise over each sub-band;

receiving an indication that speech may be present on the input sound signal; and for each of a plurality of frames while receiving the indication that speech may be present on the input sound signal;

detecting whether speech is present;

while speech is detected, estimating a speech signal magnitude for each discrete frequency by subtracting from the input sound signal magnitude for that discrete frequency the average noise for that discrete frequency multiplied by the lesser of (a) a ratio of a sum of noise-corrupted speech to a sum of average noise for the frequency sub-band containing that discrete frequency and (b) the running average of the maximum ratio of noise to average noise for the frequency sub-band containing that discrete frequency; and while speech is not detected, estimating the speech signal magnitude to be zero.

2. The method of claim 1 wherein receiving an indication that speech may be present further comprises receiving an indication that a push-to-talk button has been pressed on a microphone.

3. The method of claim 1 wherein determining an input sound signal magnitude spectrum further comprises:

low-pass filtering the input sound signal;

sampling m/2 samples of the input sound signal and appending those m/2 samples to a previous m/2 samples, thereby producing m samples;

windowing the m samples to produce a windowed signal of m points; and zero padding the windowed signal of m points by m points to produce a frame of 2 m points.

4. The method of claim 3, wherein windowing the m samples further comprises windowing the m samples using a hamming window.

5. The method of claim 1, wherein the sub-bands are chosen according to the Bark scale.

6. A method of reducing noise in a communication system, the method comprising:

receiving an input sound signal containing noise;

framing the input sound signal by performing, for each frame:

sampling m/2 samples of the input sound signal and appending those m/2 samples to a previous m/2 samples, thereby producing m samples;

windowing the m samples to produce a windowed signal of m points;

zero padding the windowed signal of m points by m points to produce a frame of 2 m points;

determining an average magnitude of the input sound signal for each of a plurality of discrete frequencies while speech is not present in the input sound signal;

dividing the input sound signal spectrum into a plurality of frequency sub-bands;

determining which of the frequency sub-bands contain only noise;

removing by a larger proportion the frequency sub-bands containing only noise from the spectrum; and estimating a speech signal magnitude for each discrete frequency by subtracting from the input sound signal magnitude for that discrete frequency the average noise for that discrete frequency multiplied by the lesser of (a) a ratio of a sum of noise-corrupted speech to a sum of average noise for the frequency sub-band containing that discrete frequency and (b) the running average of the maximum ratio of noise to average noise for the frequency sub-band containing that discrete frequency.

7. The method of claim 6, wherein windowing the m samples comprises windowing the m samples using a hamming window.

8. The method of claim 6, further comprising performing a Fourier transform on the input signal prior to performing the spectral subtraction.

9. The method of claim 6, further comprising performing a smoothing operation on the output signal to remove transients produced from a digital-to-analog conversion operation.

10. A method of reducing noise in a communication system, the method comprising:

determining an average magnitude of a noise spectrum while speech is not present on an input sound signal, wherein the average magnitude is determined for each of a plurality of discrete frequencies of the noise spectrum;

determining a maximum ratio of noise to average noise over each of a plurality of sub-bands;

determining a running average of the maximum ratio of noise to average noise over each sub-band;

receiving an indication that speech may be present on the input sound signal; and for each of a plurality of frames while receiving the indication that speech may be present on the input sound signal, estimating a speech signal magnitude for each discrete frequency by subtracting from the input sound signal magnitude for that discrete frequency the average noise for that discrete frequency multiplied by the lesser of (a) a ratio of a sum of noise-corrupted speech to a sum of average noise for the frequency sub-band containing that discrete frequency and (b) the running average of the maximum ratio of noise to average noise for the frequency sub-band containing that discrete frequency.

11. The method of claim 10, further comprising determining which of the frequency sub-bands contain only noise, and removing by a larger proportion the frequency sub-bands containing only noise from the spectrum.

12. A method of reducing noise in a communication system, the method comprising:

designating a plurality of frequency sub-bands for a signal spectrum of interest;

designating a plurality of frequency bins for each of said sub-bands;

during an initialization/update mode, determining, for each bin, an average magnitude of noise in said system over a first set of time frames;

obtaining, for each sub-band, a noise sum equal to the sum of the average noise magnitudes for the bins in the sub-band;

for each of said frames in said first set, a) determining the ratio of noise to said average noise for each bin;

b) determining for each sub-band, the maximum ratio of noise to said average noise for the bins therein;

determining a running average of said maximum ratio for each sub-band; and during a noise reduction mode, for each frame in a second set of time frames, a) obtaining, for each sub-band, an input signal sum equal to the sum of the magnitudes of an input sound signal for the bins in the sub-band;

b) determining the ratio of said input signal sum to said noise sum; and c) estimating a speech signal magnitude for a given bin as a function of i) the input sound signal magnitude for the given bin;

ii) said average noise for the given bin;

iii) the ratio of said input signal sum to said noise sum; and iv) said running average.

13. The method of claim 12, wherein operation in said initialization/update mode occurs in response to an indication that speech is not present in the input sound signal, and wherein operation in said noise reduction mode occurs in response to detection of speech.

14. The method of claim 13, wherein said estimating function includes a weighted function of said ratio of said input signal sum to said noise sum and said running average.

15. The method of claim 14, wherein said weighted function is a minimum function in which said ratio of said input signal sum to said noise sum and said running average are weighted and compared.

16. The method of claim 15, wherein said speech signal magnitude estimate is the input sound signal magnitude for the given bin minus a value proportional to the product of said average noise for the bin and the lesser of the weighted values of said ratio of said input signal sum to said noise sum and said running average.

17. The method of claim 16, further comprising determining which of the frequency sub-bands contain only noise, and removing by a larger proportion the frequency sub-bands containing only noise from the spectrum.

18. A method of reducing noise in a communication system, the method comprising:

designating a plurality of frequency sub-bands for a signal spectrum of interest;

designating a plurality of frequency bins for each of said sub-bands;

during an initialization/update mode, determining, for each bin, an average magnitude of noise in said system over a first set of time frames;

obtaining an indication of noise strength for each sub-band;

for each of said frames in said first set, determining a noise deviation for each sub-band by a) determining the ratio of noise to said average noise for each bin;

b) determining, for the sub-band, the maximum ratio of noise to said average noise for the bins therein; and during a noise reduction mode, for each frame in a second set of time frames in which an input signal is received, a) obtaining an indication of input signal strength for each sub-band;

b) determining a signal-to-noise ratio as the ratio of said input signal strength indication to said noise strength indication; and c) estimating a speech signal magnitude for a given bin as a function of i) the input sound signal magnitude for the given bin;

ii) said average noise for the given bin;

iii) said signal-to-noise ratio; and iv) said noise deviation.

19. the method of claim 18, wherein said estimating function includes a weighted function of said signal-to-noise ratio and said noise deviation.

20. The method of claim 19, wherein said weighted function is a minimum function in which said signal-to-noise ratio and said noise deviation are weighted and compared.

21. The method of claim 20, wherein said speech signal magnitude estimate is said input sound signal magnitude minus a value proportional to the product of said average noise and the lesser of the weighted values of said signal-to-noise ratio and said noise deviation.

22. The method of claim 18, wherein the determination of said noise deviation includes calculating the running average of the maximum ratio of noise to said average noise.

23. The method of claim 18, wherein said input signal strength indication is the sum of the input sound signal magnitudes for the bins in the sub-band, and wherein said noise strength indication is the sum of the average noise magnitudes for the bins in the sub-band.

24. The method of claim 18, further comprising determining which of the frequency sub-bands contain only noise, and removing by a larger proportion the frequency sub-bands containing only noise from the spectrum.

25. An adaptive noise suppression device for a voice communication system, comprising:

a signal input;

a signal output; and a noise reduction processor connected between said signal input and signal output;

wherein, during an initialization/update mode, for a plurality of frequency sub-bands each having a plurality of frequency bins, said processor is adapted to a) determine, for each bin, an average magnitude of noise over a first set of time frames;

b) obtain an indication of noise strength for each sub-band;

c) for each of said frames in said first set, determine a noise deviation for each sub-band based on the maximum ratio of noise to said average noise for each bin in the sub-band; and wherein, during a noise reduction mode, for each frame in a second set of time frames in which an input signal is received, said processor is adapted to a) obtain an indication of input signal strength for each sub-band;

b) determine a signal-to-noise ratio as the ratio of said input signal strength indication to said noise strength indication; and c) estimate a speech signal magnitude for a given bin as a function of i) the input sound signal magnitude for the given bin;

ii) said average noise for the given bin;

iii) said signal-to-noise ratio; and iv) said noise deviation.

26. The noise suppression device of claim 25, wherein said estimating function includes a weighted function of said signal-to-noise ratio and said noise deviation.

27. The noise suppression device of claim 26, wherein said weighed function is a minimum function in which said signal-to-noise ratio and said noise deviation are weighted and compared.

28. The noise suppression device of claim 27, wherein said speech signal magnitude estimate is said input sound signal magnitude minus a value proportional to the product of said average noise and the lesser of the weighed values of said signal-to-noise ratio and said noise deviation.

29. The noise suppression device of claim 25, wherein said processor calculates the running average of the maximum ratio of noise to said average noise to determine said noise deviation.

30. The noise suppression device of claim 25, wherein said input signal strength indication is the sum of the input sound signal magnitudes for the bins in the sub-band, and wherein said noise strength indication is the sum of the average noise magnitudes for the bins in the sub-band.

31. The noise suppression device of claim 25, wherein said processor determines which of the frequency sub-bands contain only noise, and removes by a larger proportion the frequency sub-bands containing only noise from the spectrum.

* * * * *